United States Patent [19]

Hassell

[11] 4,347,781
[45] Sep. 7, 1982

[54] AIR DEFLECTOR FOR MOTOR VEHICLE WINDOWS

[76] Inventor: Aarno A. Hassell, 98 Moulton Rd., Storrs, Conn. 06268

[21] Appl. No.: 56,332

[22] Filed: Jul. 10, 1979

[51] Int. Cl.³ .............................................. B60J 1/20
[52] U.S. Cl. .................................... 98/2.12; 296/91; 296/152
[58] Field of Search ............... 296/91, 84 B, 152, 154; 98/2.12, 2.13

[56] References Cited

U.S. PATENT DOCUMENTS

| | | | |
|---|---|---|---|
| 2,079,203 | 5/1937 | Fagerburg | 98/2.12 |
| 2,445,606 | 7/1948 | Davis | 296/152 |
| 2,841,440 | 7/1958 | Werner | 98/2.12 |
| 3,427,067 | 2/1969 | Kish | 296/91 |
| 3,785,699 | 1/1974 | Molaskey | 296/152 |

Primary Examiner—Robert R. Song
Attorney, Agent, or Firm—David S. Fishman

[57] ABSTRACT

An air deflector for motor vehicle windows for directing air into the interior of a motor vehicle, the air deflector including a mechanism for releasably securing the air deflector to an open window and a plate extending from the securing mechanism to the exterior of the motor vehicle to divert and direct air through the open window into the interior of the motor vehicle.

5 Claims, 4 Drawing Figures

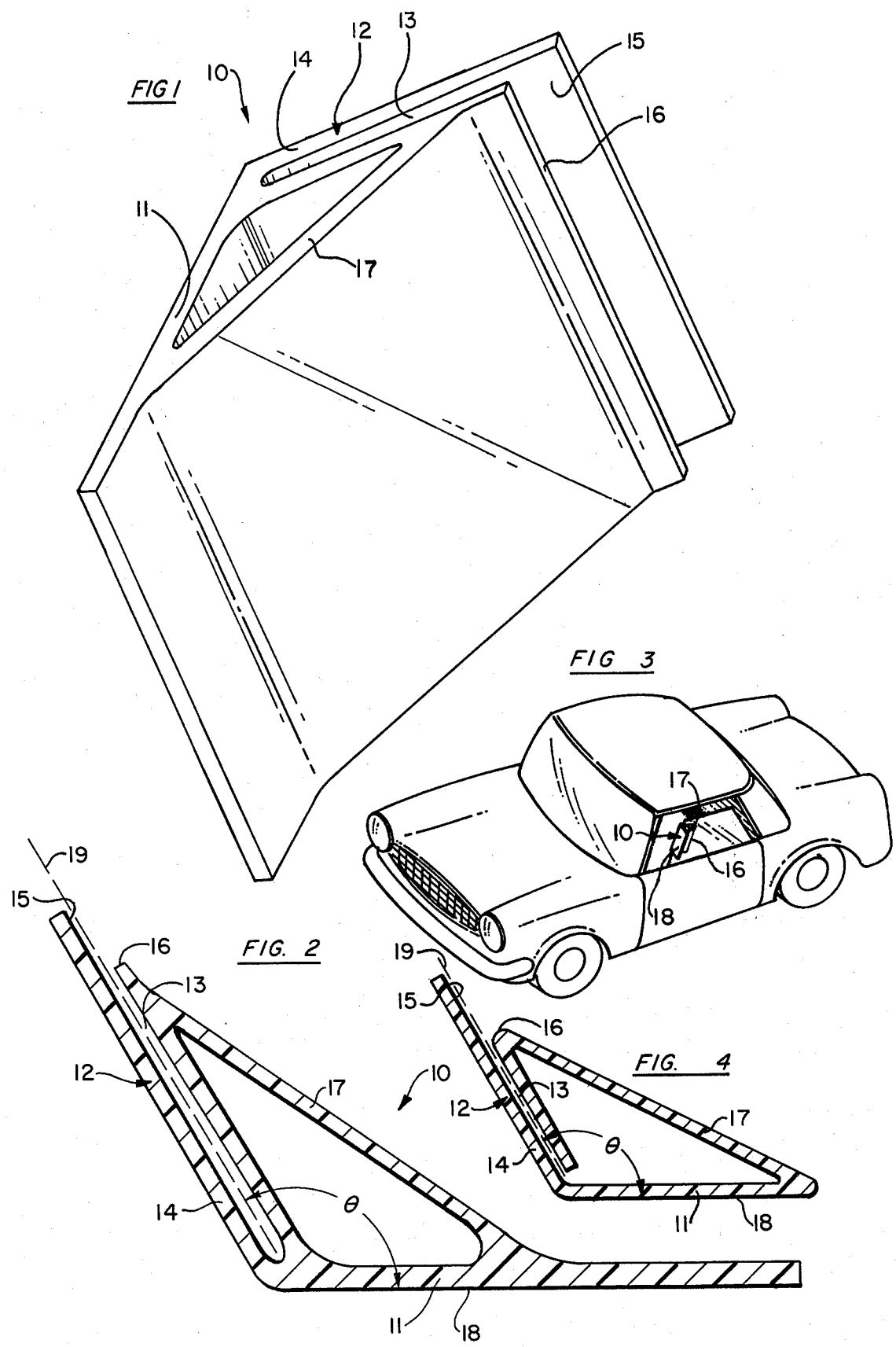

AIR DEFLECTOR FOR MOTOR VEHICLE WINDOWS

BACKGROUND OF THE INVENTION

(1) Field of the Invention

The present invention relates to the ventilation of motor vehicles such as cars and trucks. More specifically, the present invention relates to an apparatus which may be attached directly to an open window of a motor vehicle and which diverts and directs air into the interior or passenger compartment of the motor vehicle.

(2) Description of the Prior Art

Motor vehicles such as trucks and automobiles presently being manufactured do not have vent windows, that is, windows that are typically triangular in shape and which may be pivoted to extend a portion of the window to the exterior of the motor vehicle. Vent windows were eliminated from motor vehicles because they were generally expensive to manufacture, and, internal ventilation systems were substituted for vent windows in order to attempt to provide fresh air flow to the passenger compartment. As a practical matter, the internal ventilation systems are often ineffective; that is, they do not provide sufficient adequate fresh air flow into the passenger compartment. This is particularly the case during warm weather. In order to provide adequate fresh air flow into the passenger compartment, the side windows may be rolled downwardly into the door. The amount of fresh air flow directed into the passenger compartment by rolling down the window is limited due, at least in part, to the pressure differential between the passenger compartment and the exterior airflow past the open window.

A number of prior art devices have been proposed for diverting and directing air into the passenger compartment of a motor vehicle. One such apparatus is disclosed in U.S. Pat. No. 4,085,665. That patent discloses an adjustable car vent which is positioned on the interior of the car, that is, it is mounted on the left front pillar of the car forward of the driver's window. The car vent comprises a base attached to the pillar and an elongated deflector which may be stored in parallel relation to the pillar, and swung through a partial opening in the window so as to extend to the exterior of the car and direct air into the passenger compartment. The adjustable automobile vent disclosed in that patent is quite complicated and would be very expensive to manufacture. Moreover, when the elongated deflector is stored in a position parallel to the pillar, it presents a safety hazard in the event of an accident because the elongated deflector and parts for supporting the elongated deflector extend into the interior of the passenger compartment near the driver. Furthermore, the adjustable automobile vent disclosed in that patent is relatively complicated to install; that is, the vent must be secured permanently to the pillar of the car.

SUMMARY OF THE INVENTION

While not limited in its use, the air deflector of the present invention is particularly useful in motor vehicle applications. The air deflector comprises a deflector plate which extends to the exterior of the car and which is releasably secured to an open window. the deflector diverts air flowing past the window into the passenger compartment of the car.

The deflector plate comprises a flat piece of transparent plastic; and the mechanism for releasably securing the deflector plate to the window comprises a plastic body which is integral with the deflector plate and which has a window receiving tapered slot therein to receive the front edge of the window to which the air deflector is attached. When the air deflector is attached to an open window, air is directed into the passenger compartment by the deflector plate. The body is of a somewhat opened or flattened V-shape with one leg of the V being the deflector plate and the other leg of the V having a generally U-shape first elongated securing plate and a second elongated securing plate defining the tapered slot therebetween. The securing plates converge as they extend away from the deflection plate to provide for resilient gripping of the window by the two plates.

To install the air deflector apparatus, the window of a motor vehicle is partially opened, and the deflector is mounted on the window by causing the slot in the air deflector apparatus to slide over the front edge of the window. The two securing plates resiliently press against the sides of the window pane to releasably secure the air deflector apparatus in place. Although the air deflector apparatus is particularly suited for use on the left front side window of an automobile, the air deflector device may be used on any of the side windows of the motor vehicle. For any given speed of the motor vehicle, the flow rate of the air directed into the car by the air deflector may be controlled by varying the amount the window is opened. Also, the flow rate of air directed into the interior of the car can be controlled by the position at which the air deflector is located along the front edge of the opened window.

It is an object of the present invention to provide an air deflector which may be releasably secured directly to the window of a motor vehicle. It is another object of the invention to provide an air deflector which may be easily fabricated using conventional mass production plastics technology and which is inexpensive to produce. It is a further object to provide a deflector having a unitary construction with no moving parts. It is also an object to provide a deflector which may be stored inside the car when not in use, that is, it can be stored in a place that does not obstruct the view of the driver and does not present a safety hazard.

Other objects and advantages of the air deflector apparatus of the present invention will be apparent from the following detailed description of the invention with reference to the drawings.

BRIEF DESCRIPTION OF THE DRAWINGS

FIG. 1 is an upper perspective view of the air deflector apparatus;

FIG. 2 is a cross-sectional view of the air deflector apparatus shown in FIG. 1;

FIG. 3 shows a perspective of the air deflector mounted on the left front side window of an automobile; and FIG. 4 shows a cross-sectional view of an alternate version of the air deflector.

DETAILED DESCRIPTION OF THE INVENTION

Referring simultaneously to FIGS. 1 and 2, air deflector apparatus 10 comprises a deflector plate 11 which may be releasably secured to the front edge of a window by a securing mechanism 12. Securing mechanism 12 includes an elongated tapered slot 13 which receives the front edge of the window. Slot 13 is defined by a generally U-shaped body 14 having a first elongated securing plate 15 and a second elongated securing plate 16. As best shown in FIG. 2, the spacing between the plates converges as the plates extend away from deflector plate 11. Thus, when securing mechanism 12 is slid onto the window, plates 15 and 16 are spread slightly apart and resiliently hold the deflector apparatus 10 in place. When the deflector apparatus 10 is positioned on the front edge of a window, securing plate 15 is positioned adjacent the side of the window facing the interior of the car and securing plate 16 is positioned adjacent the side of the window facing the exterior of the car. Air which would normally flow past the window, is diverted by the deflector plate 11 and directed into the passenger compartment of the automobile. Since the forces on the deflector plate may be great when the motor vehicle is traveling at relatively high speeds, a strut plate 17 is provided and extends between securing plate 16 and deflector plate 11 to stiffen the apparatus.

As shown in the FIGURES, the deflector apparatus has a generally open or flattened V-shape with the angle between the front surface 18 of deflector plate 11 and a plane extending midway between plates 15 and 16 being approximately 120°. However, it should be understood that this angle $\theta$ can be in the range of about 105° to about 135° for effective deflection.

The air deflector apparatus 10 is preferably made from a transparent material so as not to obstruct the vision of the driver. The deflector apparatus 10 can be made from a number of transparent plastic materials such as, for example, polycarbonate or Kodar PETG copolyester (Eastman Chemical Products). It is preferred that the plastic material be stiff but that it be capable of deforming slightly to accommodate the window which is slid into slot 13. A typical motor vehicle window has a thickness in the range from 0.170" to 0.230". Thus, the slot 13 tapers from a dimension of approximately 0.240" to approximately 0.150". It should be understood that the most tapered portion of the slot 13 (i.e. at the open end of the slot) should have a dimension slightly less than the thickness of the window with which air deflector apparatus 10 will be used.

The air deflection apparatus 10 can be fabricated in a number of conventional manners. The most preferred manner of making large quantities of air deflectors is extruding plastic material through a die capable of producing an article with the cross-sectional shape shown in FIG. 2. The extruded article is then cut into desired lengths to provide a plurality of air deflectors. Other construction are possible. For example, the air deflection apparatus can be formed from a plurality of flat sheets of material glued together by an adhesive or a solvent weld. Alternatively, the part can be molded.

As can be appreciated from the above description, the air deflector is particularly easy to fabricate and conventional mass production methods may be used. In the preferred embodiment of the invention, the various parts of the air deflector are integral: the air deflector apparatus has a single piece construction. The air deflector may be easily installed and easily removed from the window of the motor vehicle simply by sliding it on or off; and no tools are required to install or remove the air deflector. FIG. 3 shows the air deflector mounted on the front of a partially open window on an automobile, the window being the left front or drivers' window. When not in use, the air deflector may be stored inside the car or elsewhere thus eliminating the possibility of theft or vandalism and also reducing the possibility of injury due to protruding articles inside the passenger compartment of the motor vehicle. The air deflector is made from a transparent material so that the driver's vision is not obstructed. The air deflector apparatus provides for the adjustment of air flow by simply adjusting the amount of the window opening or by sliding the air deflector along the front or leading edge of the window glass. It has been determined that when the air deflector is installed in a window of a car and the car is driven slowly, a greater air flow is produced by the air deflector than a completely open window. At relatively high speeds, the window can be adjusted and the air deflector can be positioned on the leading edge of the window so as to allow comfortable air flow and reduced wind noise. Furthermore, the air deflector may be used on either the left side windows or the right side windows simply be reversing the air deflector.

Referring to FIG. 4, wherein like elements are numbered as in FIGS. 1 and 2, an alternate version of the air deflector is shown. The structure of FIG. 4 is a one piece element which can be extruded in the shape shown, or it can be heat formed from a single sheet of plastic material. It it is heat formed from a single sheet, the sheet would be heated to form the bend or angle $\theta$ between plate 15 and surface 18, the bend between surface 18 and strut 17, and the bend between strut 17 and plate 16. The structure of FIG. 4 is particularly economical to produce, since it may be heat formed from a flat sheet or extruded in an extrusion of uniform cross thickness. Also, although slot 13 should still taper from a narrow dimension near the free end of plate 15 to a wider dimension near plate 18, the dimensioning of slot 13 may not be as critical as in the FIG. 2 embodiment, since the flexibility of the plates defining the slot will compensate for variations in window thickness.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An air deflector for a motor vehicle window comprising:

deflector means, said deflector means consisting of a flat plate, said flat plate having oppositely disposed first and second ends, said second end of said flat plate extending outwardly from the side of a motor vehicle window when said deflector means is installed;

means for releasably securing said deflector means flat plate to a window, said securing means being generally U-shaped and having first and second ends, said second end of said securing means being joined to and integral with said first end of said deflector means flat plate whereby said flat plate and said securing means formed legs of a generally V-shaped body, said securing means having an elongated slot, said elongated slot being adapted to receive the front edge of a window, said elongated slot being defined by two elongated plates, said elongated plates converging from said second end towards said first end of said securing means, said slot extending at an angle of about 105° to about 135° with respect to said deflector means flat plate; and support strut means extending between said deflector plate means and one of said securing means elongated plates.

2. An air deflector according to claim 1 wherein said securing means comprises a resilient plastic material to allow the securing plates to engage and resiliently hold the window when a window is engaged by said two elongated plates.

3. An air deflector according to claim 1 wherein the flat deflector means plate, the two securing plates and the support strut means are integral with one another.

4. An air deflector for a motor vehicle window comprising:

deflector means, said deflector means consisting of a flat plate, said flat plate having oppositely disposed first and second ends, said second end of said flat plate extending outwardly from the side of a motor vehicle window when said deflector is installed;

means for releasably securing said deflector means flat plate to a window, said securing means having first and second ends, said second end of said securing means being joined to and integral with said first end of said deflector means flat plate, said securing means having an elongated slot, said elongated slot being adapted to receive the front edge of a window, said elongated slot being defined by two elongated plates and extending at an angle of from about 105° to about 135° with respect to said deflector means flat plate, said elongated plates converging from said second end towards said first end of said securing means; and support strut means extending between said deflector means and one of said securing means elongated plates.

5. An air deflector as in claim 4 wherein the flat deflector means plate, the securing plates, and the support strut means are a single integral structure.

* * * * *